United States Patent Office 3,017,391
Patented Jan. 16, 1962

3,017,391
PREPARATION OF POLYCAPROLACTAM USING
N-ACYL ACTIVATORS
Edward H. Mottus, Ross M. Hedrick, and John M. Butler, Dayton, Ohio, assignors to Monsanto Chemical Company, St. Louis, Mo., a corporation of Delaware
No Drawing. Filed Dec. 13, 1956, Ser. No. 627,984
13 Claims. (Cl. 260—78)

This invention relates to polycaprolactams. More specifically, the invention relates to polycaprolactam (nylon 6) stabilized against the discoloration which normally occurs at elevated temperatures in the presence of air. The invention also relates to methods of preparing the aforementioned stabilized polycaprolactams.

Polyamides (nylons) have a tendency to turn somewhat yellow or even brown in the presence of oxygen (as in air)—especially when the polyamides are subjected to higher temperatures, such as during molding or extrusion of the polymer, or during ironing or pressing of nylon fabrics. Unmodified nylons, whether prepared from mixtures of dicarboxylic acids and diamines, from amino acids, or from lactams, all contain a substantial number of primary amino end groups. It is believed that oxidative attack upon these primary amino end groups is principally responsible for the color instability.

It has now been found that in the case of polymerization of caprolactam, the primary amino end groups normally present can be inactivated or protected to give a polymer having greatly improved color stability. The discovery of the particularly desirable way to effect this stabilization resulted from the discovery of the mechanism whereby base-catalyzed (i.e., alkali or alkaline earth metal catalyzed) caprolactam is polymerized. Consequently, it is believed that a brief discussion of this mechanism will be helpful in understanding the present invention. It will be noted that in this discussion of mechanism, sodium is used as the example of a base metal catalyst. As is well known, however, the base-catalyzed caprolactam polymerization is not limited to the use of sodium, but is general to all alkali and alkaline earth metals (e.g., K, Li, Ca, Sr, Ba, Mg, etc). These metals are effective either in the metallic form or in the form of hydrides, fluorohydrides, oxides, hydroxides, carbonates, etc. Also useful are the organo-metallic compounds of these metals such as the lithium, potassium and sodium alkyls, e.g., butyl lithium, and the aryl compound of such metals such as sodium phenyl. Sodium amide is also a useful catalyst. The polymerization is generally carried out with a catalyst concentration ranging anywhere from a fraction of 1% to as much as 15 or 20%, based upon the quantity of monomer to be polymerized.

The reaction mechanism of base-catalyzed polymerization of caprolactam is considerably different from the conventional aqueous polymerization of caprolactam as practiced in the commercial production of nylon 6. The aqueous polymerization involves hydrolysis of the lactam with water to form a linear amino acid, followed by condensation of the amino groups and carboxyl groups to form a linear polyamide. In contrast thereto, the base catalyzed polymerization of caprolactam is carried out in the complete absence of water, without formation of amino acids. The mechanism of base-catalyzed polymerization of caprolactam is represented by the following equations:

[Eq. 1] 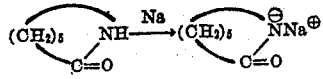

[Eq. 2] 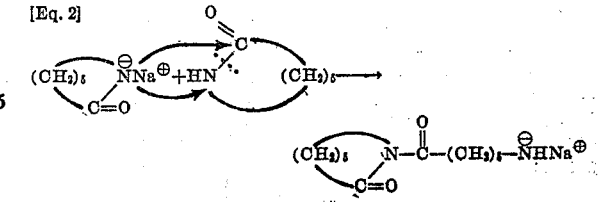

[Eq. 3] 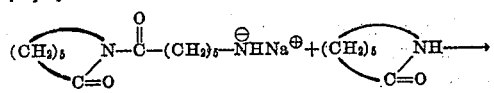

[Eq. 4] 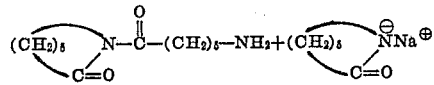

[Eq. 5] 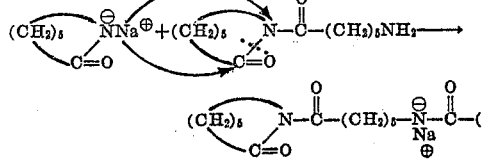

[Eq. 6] 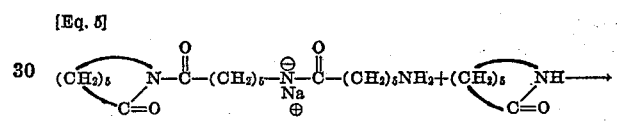

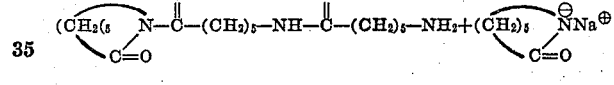

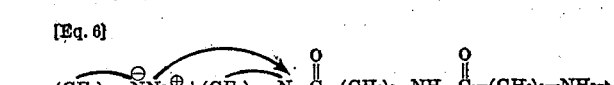

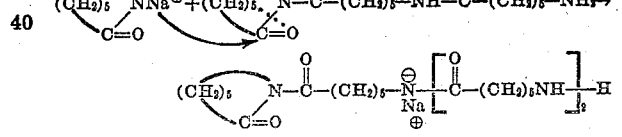

The reaction indicated by Equations 3 through 6 are continued indefinitely, the sodium atom being repeatedly transferred to a new caprolactam monomer molecule which in turn becomes attached to the polymer molecule by opening the lactam ring at the end of the polymer molecule.

From the foregoing, it will be noted that the base caatalyzed polymerization involves consecutive reactions of two different general categories: (1) opening a lactam ring between an acyl group and a secondary nitrogen atom and (2) opening a lactam ring between an acyl group and a tertiary nitrogen atom. The first type of reaction is illustrated in Equation 2, the second type of reaction is illustrated by Equations 4 and 6. The primary amino group results only from the reaction involving the secondary nitrogen atom (Equations 2 and 3) whereby N-(ω-aminocaproyl)-ε-caprolactam is formed. Further polymerization centers around the N,N-diacyl group at the other end of the polymer molecule, and this polymerization proceeds independently of the presence of the primary amino group. Consequently, if an N,N-diacyl compound free of primary amino groups is substituted for the N - (ω - aminocaproyl - ε - caprolactam formed in Equations 2 and 3 and reacted in Equation 4, further polymerization will proceed in the same general manner indicated above to give a polymer free of the primary amino end group and more stable to oxidative discoloration.

Compounds which are suitable as substitutes for the N-(ω-aminocaproyl)-ε-caprolactam are any which are free of primary amino groups but which will behave similarly to the aforementioned aminocaproylcaprolactam in reacting with sodium caprolactam by (1) taking the sodium atom from the nitrogen atom of the sodium caprolactam and (2) replacing this sodium atom with an acyl group. These requirements are met by the class of compounds containing the following essential active group:

wherein N is a tertiary nitrogen atom (i.e., has no hydrogen atoms attached thereto), A is an acyl radical selected from

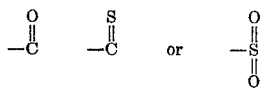

and B is an acyl radical selected from

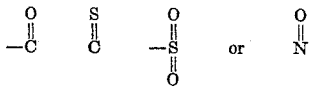

The requirement that the nitrogen atom be tertiary follows from the fact that if hydrogen is present on that nitrogen, the sodium (from the sodium caprolactam) will merely remove the hydrogen instead of rupturing the bond between the nitrogen atom and the acyl group. At least two acyl groups must be attached to the tertiary nitrogen atom in order to activate at least one of the nitrogen-acyl group bonds sufficiently to break under the prevailing polymerization conditions. The term "tertiary nitrogen atom" compounds means nitrogen-containing compounds wherein the nitrogen atom is trivalent and in the essential portion of such compounds at least two of the nitrogen bonds are directly attached to acyl radicals from the above-listed group and the third nitrogen bond is attached to a third such acyl radical or a carbon atom, wherein the remainder of said compounds are composed of organic radicals to satisfy the available valences, as hereinafter more fully set forth and exemplified.

In the compounds containing the essential active group

the third group (other than A or B), designated R, attached to the nitrogen atom may be a third substituent of the same kind of general type as A or B; or a hydrocarbyl radical such as aryl, alkyl, aralkyl, alkaryl, cycloalkyl, etc.; or a heterocyclic radical such as pyridyl, quinolyl, etc.; or any of the aforementioned groups substituted with or containing additional radicals or groups such as carbonyl, N-substituted carbamyl, alkoxy, ether, sulfonyl, tertiary amino, etc.; or any other non-interfering groups (i.e., groups which will not preferentially react with the caprolactam or which will not otherwise interfere with the essential effective activity of the polymerization catalyst or of the present stabilizing compounds).

The substituents attached to the carbonyl, thiocarbonyl and sulfonyl radicals A and B are unlimited, provided they are free of interfering groups (e.g., primary amino groups or strong acid functions which will interfere with the alkali or alkaline metal catalysts). Examples of non-interfering groups are hydrogen atoms, as well as the hydrocarbyl and heterocyclic radicals mentioned in the preceding paragraph, including such radicals substituted with or containing polar-substitutents such as tertiary amino, acylamido, N-substituted carbamido, ether, etc.

The radicals A and B can be attached together to form a ring system (e.g., the cyclic imides described in greater detail below). Likewise, the radical A and the tertiary nitrogen atom can constitute a part of a ring system not including the radical B (e.g., the lactams described below).

A preferred class of materials having the aforementioned structure are N-substituted imides, i.e., compounds of the foregoing type having at least two acyl groups attached directly to the tertiary nitrogen atom. This group of compounds can be represented by the following structural formula:

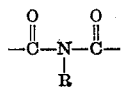

A particularly effective class of N-substituted imides are the N-acyl lactams such as N-acetyl-2-pyrrolidone, N-acetyl-ε-caprolactam, N-benzoyl - ε - caprolactam, N-benzoyl-δ-valerolactam, N - ethylcarbamyl-ε-caprolactam, N-propionyl-ω-caprylolactam, N - toloyl-ω-decanolactam, etc.

Another preferred class of N-substituted imides comprise the cyclic imides of dicarboxylic acids. Examples of this class are N-phenylsuccinimide, N-phenylmaleimide, N-methylsuccinimide, N - methylphthalimide, N-acetyltetrahydrophthalimide, N - benzoylsuccinimide, N-benzoylphthalimide, etc.

Another preferred class of N-substituted imides comprise those having a multiplicity of the essential N,N-diacyl tertiary nitrogen atom groups. This class includes compounds in which a portion of the group (for example, an acyl radical) is common to two or more of the essential polymerization promoting structures. Examples of this class are the N,N′,N″-trimethylester of isocyanuric acid, N,N′ - di(phenylcarbamyl)-N,N′-dimethylurea, ethylene disuccinimide, etc.

Examples of other N-substituted imides suitable for the above-described improved polymerization are N,N-diacetylmethylamine, N,N-dibenzoylaniline, triacetamide, N-acetyl-N-formyl ethylamine, N-propionylsaccharin, etc.

Another general class of stabilizing compounds useful according to the present invention comprise the N-acyl sulfonamides containing no hydrogen atom on the sulfonamide nitrogen atom. Examples of this general class of materials are N-acetyl-N-ethyl-p-toluenesulfonamide, N-ethyl-N-lauroylethanesulfonamide, N,N-diacetylmethanesulfonamide, N-(phenylsulfonyl)succinimide, N-methylsaccharin, N-acetylsaccharin, N-acetyl-N-methylbenzenesulfonamide and numerous other N-acyl sulfonamides, including compounds of the following type,

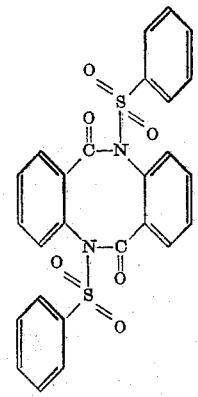

i.e. 6,12-di(phenylsulfonyl) - sym - dibenzo-6,12-diazacyclooctane-5,11-dione, such as is derived from the reaction of o-benzenesulfonamidobenzoyl chloride when heated with pyridine.

Another class of suitable compounds for use according to the present invention comprise the disulfonamides such as N,N-di(p-toluenesulfonyl)anilide, N,N-di(benzenesulfonyl)methylamine, and other N,N - dibenzenesulfonyl alkylamines, as well as the corresponding N,N-dialkanesulfonylalkylamines such as N,N-di-(methanesulfonyl) ethylamine, etc.

Another general type of effective stabilizing compounds comprise the N-nitrosoamides. Representative members of this class of compounds are N-nitroso-2-pyrrolidone, N-nitrososuccinimide, N,N-diacetylnitrosamine, N-nitroso-N-acetyl-propylamine, N-nitroso-N,N'-di-n-butylurea, N-methyl-N-nitrosourethane and other N-substituted N-nitroso-carbamates, etc.

Another general class of stabilizers for the present polymerization comprises the N-nitrososulfonamides, such as N-nitroso - N - methyl-benzenesulfonamide, N-nitroso-N-methyl-p-toluenesulfonamide, N-nitroso-N-ethyl-methanesulfonamide, N-nitroso-N-phenethyl-butanesulfonamide, etc.

As was indicated above, one or more of the acyl oxygen atoms of the various compounds described herein may be substituted with sulfur atoms to form the corresponding thioacyl compounds without destroying the effectiveness of such compounds as promoters for the polymerization of ε-caprolactam. Examples of such thio compounds are 1-acetyl-2-thiohydantoin and 3-butyl-5,5-dimethyl-2-thio-2,4-oxazolidinedione. Other suitable thio analogs of the foregoing acyl compounds are N-thiobenzoyl-2-pyrrolidone, N-thiopropionylmaleimide, N-phenyldithiosuccinimide, N-(n-octylcarbamyl)-2-thiopyrrolidone, etc.

The present process for producing stabilized nylon 6 has some additional very significant practical advantages. For example, prior workers in the field have always considered that the base-catalyzed caprolactam polymerization had to be carried out at temperatures considerably in excess of 200° C. We have now found, however, that it is only the reaction of Equation 2, above, that requires such a high temperature—and that the actual polymerization as indicated by Equations 4, etc. will take place at much lower temperatures, e.g., as low as 80° C. or lower. Since the process of the present invention eliminates the need for carrying out the reaction of Equation 2, it is now possible to carry out the base-catalyzed polymerization of caprolactam at considerably lower temperatures than heretofore possible.

Polymerization at lower temperatures has additional advantages beyond those obvious ones which generally result from the use of lower temperatures. For example, we have also found that the base-catalyzed polymerization of caprolactam is an equilibrium reaction with the equilibrium shifting toward a higher conversion to polymer with decreasing temperatures. Thus, by carrying out the polymerization at temperatures substantially below 200° C. (for example, from 130° to 170° C.), it is possible to obtain conversions of greater than 99 percent, as compared with conversions of around 90 percent at temperatures around 225° C. or higher.

There are numerous other incidental benefits which can be taken advantage of because of the rapidity and ease with which the present polymerization proceeds at relatively low temperatures. For example, plasticizers can be dissolved or otherwise incorporated into the monomer and will be more uniformly distributed through the resulting polymer. Likewise, polyblends can be prepared by dissolving or otherwise distributing another polymer (e.g., polystyrene) into the lactam monomer before polymerization. Volatile blowing agents can be incorporated into the monomer, which is then polymerized at a temperature below the boiling point or decomposition temperature of the blowing agent; subsequent heating of the polymer to a higher temperature (above the softening point of the polymer) will give a uniformly foamed polymer mass. Insoluble pigments can be incorporated into the monomer, which can then be polymerized before any substantial settling of the pigment takes place. Likewise, soluble dyes can be incorporated into the monomer. Because the polymerization can be carried out so rapidly at temperatures below the softening point of the resulting polymer, the present process is highly suitable for polymerization of polymer in predetermined shapes or forms. Centrifugal polymerization-casting of objects such as pipe or tubing is particularly feasible. The foregoing polymerization-casting type of operation is enhanced by the fact that there is a very slight shrinkage of polymer during polymerization, thereby causing the molded object to pull away from the mold and facilitate removal from the mold without cooling.

Another advantage flowing at least in part from the ability of the present process cause polymerization at low temperature is the ability to prepare nylon 6 having a much higher molecular weight than any that could be prepared by prior polymerization methods. It will be noted that in the conventional base-catalyzed polymerization of caprolactam (Equations 1 through 6), the sodium catalyst atoms are continuously released to regenerate more sodium caprolactam monomer. Since this sodium caprolactam is not limited to reacting only with polymer molecules (as indicated in Equations 4 and 6), but can react with other caprolactam monomer molecules as well (as in Equation 2), it is readily apparent that there is no control over the number of polymer molecules that can be started during the conventional polymerization. Since the molecular weight of the ultimate polymer composition will vary inversely with the number of polymer molecules in the composition, it is very difficult to obtain a high molecular weight material by the prior polymerization methods. When the polymerization method of the present invention is carried out at relatively low temperatures (e.g., less than 190° or so), the reaction of Equation 2 does not take place and no N-(ω-aminocaproyl)-ε-caprolactam is formed. The only opportunity for polymer molecule formation results from the artificially introduced diacyl tertiary nitrogen stabilizing compounds. Thus, with the present process the number of polymer molecules formed can be limited (by restricting the quantity of stabilizer compound utilized), thereby making polymer compositions of very high molecular weight (e.g., 50,000 and higher). Such a super-molecular weight nylon is of practical importance in that it can be used for film blowing, injection molding, film calendering, etc. The conventional molecular weight nylons are not very suitable for such purposes without modification of the polymer, either by cross-linking agents or by modifications which materially lower the melting point of the polymer.

There is another advantage resulting from inactivation of the primary amine end groups by the process of this invention. In conventional alkali or alkaline earth metal polymerization, there is a tendency for the growing end of the polymer chain to circle back and react with the primary amino group at the other end of the chain, thereby forming varying proportions of cyclic polymer molecules along with the linear polyamides. The use of the present stabilizing agents, which inactivates the primary amino end groups, insures production of more uniform linear polymer substantially free of cyclic polyamides.

The amount of stabilizing agent used in the process of the present invention will generally run between about 0.01 and about 20 mole percent, and preferably between about 0.1 and about 1 mole percent of caprolactam monomer, with the lower concentrations being used when the super-molecular weight material is desired.

The polymerization temperatures utilized according to the present invention will vary somewhat, depending upon desired reaction rates, conversion and other factors discussed herein. In general, it is preferred to carry out the polymerization below about 190° C., since below that temperature the reaction indicated by Equation 2, above, does not take place and the resulting polymer will be substantially free of primary amino groups which would result from that reaction. Some of the present stabilizing modifiers are less thermally stable than others. Consequently, the less stable modifiers (e.g., some of the imides such as N-methyl succinimide) should be used only at the very low temperatures. (It should be noted that the thermal instability referred to in the preceding sentence refers only to the N,N-diacyl tertiary nitrogen compound itself—not to the stabilized polymer formed therefrom.)

It is possible to practice the above-described invention by utilizing compounds which will react with caprolactam monomer to form the stabilizing modifier compound

in situ in the polymerization mixture. Examples of such compounds are isocyanates and ketenes, which will react readily with caprolactam to form N-carbamyl-ε-caprolactams and N-carbonyl-ε-caprolactams, respectively, both of which are very effective stabilizing modifiers. Other such classes (of compounds which will form stabilizing modifiers in situ) comprise acid chlorides and anhydrides. However, these are less desirable because of formation of byproducts (such s hydrogen chloride or carboxylic acids) during the reaction with caprolactam. In such cases, either the byproduct must be removed, or additional catalyst must be utilized to compensate for that which will be inactivated by the acidic by-product.

The following examples will serve to further illustrate the practice of the present invention and the benefits derived therefrom:

Example 1

Eight hundred fifty grams of ε-caprolactam and 1.5 grams of sodium hydride were placed in a 3-liter Erlenmeyer flask. In another flask were placed 845 grams of ε-caprolactam and 5.8 grams of N-acetyl-ε-caprolactam. Both mixtures were heated to 115° C. under an atmosphere of dry nitrogen and then poured together and stirred by bubbling a stream of dry nitrogen through the mixture. The mixture was raised to about 130° C., at which point polymerization was evidenced by appearance of insoluble polymer particles which caused the solution to turn cloudy. The reaction flask was stoppered and placed in an oven at 160° C. for 12 hours, at which time the entire reaction mass had become a solid block of polymer.

The polymer block was broken up, ground into small chips and leached for one hour in a boiling solution made up of 5 liters of water and 100 ml. of formic acid. The leached solid was then filtered from the solution, washed with water and acetone, and dried in a vacuum oven over night at 90° C. to give a 98.8% yield of polymer.

Example 2

One mole (113 grams) of ε-caprolactam, 0.005 mole (0.58 gram) of N,N-diacetylmethylamine and 0.1 gram of sodium hydride were heated under an atmosphere of dry nitrogen at 160° C. for two hours. The resulting solid was cooled, ground and leached in boiling water and dried to give a 99.2% yield of solid polymer.

Example 3

One mole (113 grams) of ε-caprolactam, 0.005 mole (0.405 grams) of ethyl isoyanate and 0.1 gram of sodium hydride were melted together under a nitrogen atmosphere at 100° C. and then heated to 160° C. for 12 hours. Upon cooling, grinding, leaching with boiling water and drying, solid polymer was recovered in 99.0% yield.

Example 4

Two-tenths mole (22.6 grams) of ε-caprolactam, 0.001 mole (0.23 gram) of N-acetyl-N-methyl p-toluenesulfonamide and 0.002 mole (0.05 gram) of sodium hydride were melted at 110° C. and then heated at 160° C. for 4 hours. Upon cooling, grinding, leaching in boiling 2% aqueous formic acid solution and drying in a vacuum oven at 85° C., there was obtained a 97.7% yield of solid polymer.

Example 5

An air-tight container measuring 12″ x 12″ x 1″ was filled with molten ε-caprolactam containing 1.11 weight percent of 4,4′-diisocyanatodiphenylmethane and 0.009 weight percent sodium hydride, and heated in an oil bath at 160° for four hours. Upon cooling the solid polymer was ground, leached in boiling 2% aqueous formic acid and dried to give a yield of 98.6% polymer.

Example 6

One mole (113 grams) of ε-caprolactam, 0.005 mole (0.87 gram) of 2,4-tolylene diisocyanate and 0.1 gram of sodium hydride were heated together at 160° C. for three hours under an atmosphere of dry nitrogen. Upon cooling, grinding, leaching in boiling 2% aqueous formic acid solution and drying, there was obtained a 97.0% yield of solid polymer.

Example 7

One hundred thirteen grams of ε-caprolactam, 0.1 gram of sodium hydride, and 1 gram of the triisocyanate formed by reacting 1,1,1-trihydroxymethylpropane with 3 moles of 2,4-tolylenediisocyanate were heated together for four hours at 160° C. Upon cooling, grinding, leaching in boiling 2% aqueous formic acid solution and drying, there was obtained a 98.9% yield of solid polymer.

Example 8

One-half mole (56.5 grams) of ε-caprolactam, 0.58 gram of N-phenylsuccinimide and 0.15 gram of sodium hydride were heated together for 18 hours at 80° C., after which time solid polymer began precipitating from the monomer solution. Polymerization was allowed to continue for about 20 hours more. Upon cooling to room temperature, washing with water and drying, about 1 gram of solid polymer was obtained.

Example 9

One-half mole (56.5 grams) of ε-caprolactam, 0.4 gram of N-methylphthalimide and 0.1 gram of sodium hydride were heated together for four hours at 160° C. under an atmosphere of dry nitrogen. The resulting solid reaction mass was cooled, ground, leached with boiling 2% aqueous formic acid solution and dried to give a 95.9% yield of solid polymer.

Example 10

One-half mole (56.5 grams) of ε-caprolactam, 0.0025 mole (0.32 ml.) of N-acetyl-2-pyrrolidone and 0.05 gram of sodium hydride were heated together at 160° C. for three hours under an atmosphere of dry nitrogen. Upon cooling to room temperature, grinding, leaching with boiling 2% aqueous formic acid solution and drying, there was obtained a 98.2% yield of solid polymer.

Example 11

In order to demonstrate the remarkable stability of the polymers of the present invention, each of the polymer samples prepared as described in the preceding examples were heated in an air-circulating oven at 165° C. for six hours. For purposes of comparison, a sample of nylon 6 prepared by conventional sodium polymerization procedures (i.e., not having the primary amino end groups inactivated), as well as commercial samples of nylon 6 and nylon 6,6 prepared by the water-catalyzed or condensation techniques were also treated in the same manner. All of the samples were originally white or light yellow in color. After the 6 hours at 165° C., the control samples (not having the primary amino end groups blocked in accordance with this invention) had turned dark brown, whereas all of the samples prepared according to the present invention were markedly less discolored. A quantitative comparison of the amount discoloration of the various samples before and after being heated in air is set forth in the following table—wherein the change of color is expressed in terms of the Gardner color standard.

| Polymer Sample | Discoloration (increase in Gardner color index) |
| --- | --- |
| Example 1 | 8 |
| Example 2 | 3 |
| Example 3 | 5 |
| Example 4 | 2 |
| Example 5 | 2 |
| Example 6 | 6 |
| Example 7 | 5 |
| Example 8 | 2 |
| Example 9 | 1 |
| Example 10 | 4 |
| Control A (base-catalyzed nylon 6, unstabilized) | 10 |
| Control B (water-catalyzed nylon 6, unstabilized) | 10 |
| Control C (condensation polymer, nylon 6,6, unstabilized) | 12 |

We claim:
1. The method of producing an oxidation stable poly-(ε-caprolactam) substantially free of primary amino end groups which method comprises polymerizing ε-caprolactam under substantially anhydrous conditions in the presence of (1) a catalyst selected from the group consisting of alkali metal and alkaline earth metal catalysts and (2) between about 0.01 and about 20 mole percent, based on the ε-caprolactam monomer, of a nitrogen-containing promoter compound in which the nitrogen atoms are trivalent and in which at least one nitrogen atom is directly attached to at least two radicals selected from the group consisting of carbonyl, thiocarbonyl, sulfonyl, and nitroso radicals and no promoter compound has more than one nitroso radical directly attached to said nitrogen atom, the remaining bonds of said nitrogen atom being attached to a member from the group consisting of said radicals and carbon, the remainder of said promoter compound being composed of organic radicals sufficient to satisfy the remaining available valences and no nitrogen atom in said organic radicals has more than one hydrogen atom attached directly thereto, and wherein the polymerization process is initiated at a temperature above the melting point of the ε-caprolactam monomer and below the softening point of the polycaprolactam.

2. The method of claim 1, wherein from about 0.01 to about 1 mole percent of a nitrogen-containing promoter compound having at least two carbonyl radicals directly attached to the nitrogen atom is employed and the polymerization process is carried out at a temperature below about 190° C.

3. The method of claim 2, wherein the nitrogen-containing promoter compound is an N-carbonyl lactam.

4. The method of claim 1, wherein the polymerization process is carried out at a temperature below about 190° C.

5. The method of claim 4, wherein the nitrogen-containing promoter compound is employed in an amount between about 0.01 and about 1 mole percent.

6. A process for forming shaped articles of polycaprolactam comprising the steps of charging a mold with ε-caprolactam and polymerizing said ε-caprolactam in situ in said mold under substantially anhydrous conditions in the presence of (1) a catalyst selected from the group consisting of alkali metal and alkaline earth metal catalysts and (2) between about 0.01 and about 20 mole percent, based on the ε-caprolactam monomer, of a nitrogen-containing promoter compound in which the nitrogen atoms are trivalent and in which at least one nitrogen atom is directly attached to at least two radicals selected from the group consisting of carbonyl, thiocarbonyl, sulfonyl, and nitroso radicals and no promoter compound has more than one nitroso radical directly attached to said nitrogen atom, the remaining bonds of said nitrogen atom being attached to a member from the group consisting of said radicals and carbon, the remainder of said promoter compound being composed of organic radicals sufficient to satisfy the remaining available valences and no nitrogen atom in said organic radicals has more than one hydrogen atom attached directly thereto, and wherein the polymerization process is initiated at a temperature above the melting point of the ε-caprolactam monomer and below the softening point of the polycaprolactam.

7. The process according to claim 6, wherein the mold is rotated about one of its axes during polymerization.

8. The process according to claim 7, wherein the mold is a cylinder having flanged ends to retain the fluid monomer composition during centrifugal polymerization-casting.

9. The process according to claim 6, wherein the polymerization reaction is initiated at a temperature of from about 130° C. to about 190° C.

10. The method of producing an oxidation stable poly-(ε-caprolactam) substantially free of primary amino end groups which method comprises polymerizing ε-caprolactam under substantially anhydrous conditions in the presence of (1) a catalyst selected from the group consisting of alkali metal and alkaline earth metal catalysts and (2) between about 0.01 and about 1 mole percent, based on the ε-caprolactam monomer, of N-acetyl-2-pyrrolidone, wherein the polymerization process is carried out at a temperature below about 1990° C.

11. The method of producing an oxidation stable poly-(ε-caprolactam) substantially free of primary amino end groups which method comprises polymerizing ε-caprolactam under substantially anhydrous conditions in the presence of (1) a catalyst selected from the group consisting of alkali metal and alkaline earth metal catalysts and (2) between about 0.01 and about 1 mole percent, based on the ε-caprolactam monomer, of N,N-diacetylmethylamine, wherein the polymerization process is carried out at a temperature below about 190° C.

12. The method of producing an oxidation stable poly-(ε-caprolactam) substantially free of primary amino end groups which method comprises polymerizing ε-caprolactam under substantially anyhdrous conditions in the presence of (1) a catalyst selected from the group consisting of alkali metal and alkaline earth metal catalysts and (2) between about 0.01 and about 1 mole percent, based on the ε-caprolactam monomer, of N-acetyl-N-methyl p-toluenesulfonamide, wherein the polymerization process is carried out at a temperature below about 190° C.

13. The method of producing an oxidation stable poly-(ε-caprolactam) substantially free of primary amino end groups which method comprises polymerizing ε-caprolactam under substantially anhydrous conditions in the presence of (1) a catalyst selected from the group consisting of alkali metal and alkaline earth metal catalysts and (2) between about 0.01 and about 1 mole percent, based on the ε-caprolactam monomer, of N-acetylcaprolactam, wherein the polymerization process is carried out at a temperature below about 190° C.

References Cited in the file of this patent

UNITED STATES PATENTS

| 2,241,321 | Schlack | May 6, 1941 |
| 2,241,322 | Hanford | May 6, 1941 |
| 2,277,152 | Schlack | Mar. 24, 1942 |
| 2,698,845 | Mastin et al. | Jan. 4, 1955 |
| 2,739,959 | Ney et al. | Mar. 27, 1956 |

FOREIGN PATENTS

| 152,028 | Australia | Feb. 8, 1951 |
| 60,801 | Denmark | Apr. 12, 1953 |
| 541,201 | Belgium | Sept. 30, 1955 |

UNITED STATES PATENT OFFICE
CERTIFICATE OF CORRECTION

Patent No. 3,017,391                        January 16, 1962

Edward H. Mottus et al.

It is hereby certified that error appears in the above numbered patent requiring correction and that the said Letters Patent should read as corrected below.

Column 2, line 52, for "caatalyzed" read -- catalyzed --; line 67, after "aminocaproyl" insert a closing parenthesis; column 6, line 12, after "process" insert -- to --; column 7, line 22, for "s" read -- as --; line 63, for "isoyanate" read -- isocyanate --; column 9, in the table, second column, line 1 thereof, for "8" read -- 2 --; column 10, line 29, for "1990° C." read -- 190° C. --.

Signed and sealed this 17th day of November 1964.

(SEAL)
Attest:

ERNEST W. SWIDER
Attesting Officer

EDWARD J. BRENNER
Commissioner of Patents